(12) United States Patent
Dwivedi et al.

(10) Patent No.: US 8,938,479 B1
(45) Date of Patent: Jan. 20, 2015

(54) SYSTEMS AND METHODS FOR DYNAMICALLY SELECTING A LOGICAL LOCATION FOR AN INDEX

(75) Inventors: Alok Dwivedi, Earley Reading (GB); Eduardo Suarez, Marlow (GB)

(73) Assignee: Symantec Corporation, Mountain View, CA (US)

( * ) Notice: Subject to any disclaimer, the term of this patent is extended or adjusted under 35 U.S.C. 154(b) by 761 days.

(21) Appl. No.: 12/752,884

(22) Filed: Apr. 1, 2010

(51) Int. Cl.
*G06F 17/30* (2006.01)

(52) U.S. Cl.
USPC ............ 707/812; 707/696; 711/154; 718/105

(58) Field of Classification Search
CPC ........................................................ G06F 9/50
USPC ................. 707/688, 696, 741, 711, 715, 812; 702/182; 718/105; 711/154
See application file for complete search history.

(56) References Cited

U.S. PATENT DOCUMENTS

| | | | | |
|---|---|---|---|---|
| 5,491,810 A * | 2/1996 | Allen | ............................ | 711/117 |
| 5,544,356 A * | 8/1996 | Robinson et al. | ............. | 707/821 |
| 6,366,931 B1 * | 4/2002 | Borowsky et al. | ..................... | 1/1 |
| 7,010,657 B2 * | 3/2006 | Lowe et al. | .................... | 711/165 |
| 7,043,621 B2 * | 5/2006 | Merchant et al. | ............. | 711/173 |
| 7,127,565 B2 * | 10/2006 | Kazar | ............................ | 711/152 |
| 7,225,211 B1 * | 5/2007 | Colgrove et al. | ............. | 707/693 |
| 2001/0027467 A1 * | 10/2001 | Anderson et al. | ............. | 709/201 |
| 2002/0184380 A1 * | 12/2002 | Weider et al. | ................... | 709/230 |
| 2003/0046270 A1 * | 3/2003 | Leung et al. | ....................... | 707/1 |
| 2003/0093439 A1 * | 5/2003 | Mogi et al. | ..................... | 707/200 |
| 2004/0267553 A1 * | 12/2004 | Brunton | ............................ | 705/1 |
| 2005/0273552 A1 * | 12/2005 | Brazis et al. | .................. | 711/104 |
| 2007/0106843 A1 * | 5/2007 | Mori et al. | ..................... | 711/114 |
| 2007/0112875 A1 * | 5/2007 | Yagawa | ........................ | 707/200 |

OTHER PUBLICATIONS

Change the content index location for an index server (Office SharePoint Server 2007). Updated: Aug. 28, 2008 http://technet.microsoft.com/en-us/library/cc850697(v=office.12).aspx.*

* cited by examiner

*Primary Examiner* — Ajay Bhatia
*Assistant Examiner* — Miranda Huang
(74) *Attorney, Agent, or Firm* — Holland & Hart LLP

(57) ABSTRACT

A computer-implemented method for dynamically selecting a logical location for an index is described. Information relating to a computing device and a location within the computing device is collected. The information is uploaded to a database. The database is queried for stored information relating to at least one computing device and at least one location within the at least one computing device. A performance score is calculated from the stored information. A logical location for the index is selected based on the calculated scores.

16 Claims, 7 Drawing Sheets

SYSTEMS AND METHODS FOR DYNAMICALLY SELECTING A LOGICAL LOCATION FOR AN INDEX

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet. Many businesses use one or more computer networks to communicate and share data between the various computers connected to the networks. The productivity and efficiency of employees often requires human and computer interaction. Users of computer technologies continue to demand that the efficiency of these technologies increase. Improving the efficiency of computer technologies is important to anyone that uses and relies on computers.

Data may be stored on a computer system. The selection of the computer system and the location within the computer system for the storage of data may not be efficient. For example, the selected location may not provide the optimum results. As such, benefits may be realized by providing systems and methods for efficiently and dynamically selecting a logical location to store data.

SUMMARY

According to at least one embodiment, a computer-implemented method for dynamically selecting a logical location for an index is described. Information relating to a computing device and a location within the computing device is collected. The information is uploaded to a database. The database is queried for stored information relating to at least one computing device and at least one physical location within the at least one computing device. A performance score is calculated from the stored information. A logical location for the index is selected based on the calculated scores.

In one example, selecting a logical location may include selecting at least one computing device and at least one location within the selected computing device to store the index. The information relating to the computing device may include information relating to the performance of the computing device. In addition, the information relating to the location within the computing device may include information relating to the utilization of the location.

In one embodiment, calculating a performance score may include assigning a weight factor to at least one parameter of the stored information relating to the at least one computing device and the at least one location within the at least one computing device. In one configuration, an existing index may be relocated from an overloaded computing device to at least one additional computing devices.

In one example, the information may be uploaded to the database during a predetermined interval of time. In one embodiment, calculating the performance score may include calculating a device score for the at least one computing device. Further, calculating the performance score may include calculating a location score for the at least one location within the at least one computing device.

A computer system configured to dynamically select a logical location for an index is also described. The computer system may include a processor and memory in electronic communication with the processor. The computer system may include a monitoring module configured to collect information relating to the computer system and a logical location on the computer system, and upload the information to a database. The monitoring module may also be configured to query the database for stored information relating to at least one computer system and at least one logical location on the at least one computer system. Further, the monitoring module may be configured to calculate a performance score from the stored information, and select a logical location for the index based on the calculated scores.

A computer-program product for dynamically selecting a logical location for an index is also described. The computer-program product may include a computer-readable medium having instructions thereon. The instructions may include code programmed to collect information relating to a computing device and a logical location on the computing device, and code programmed to upload the information to a database. The instructions may further include code programmed to query the database for stored information relating to at least one computing device and at least one logical locations on the at least one computing device. In addition, the instructions may include code programmed to calculate a performance score from the stored information, and code programmed to select a logical location for the index based on the calculated scores.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
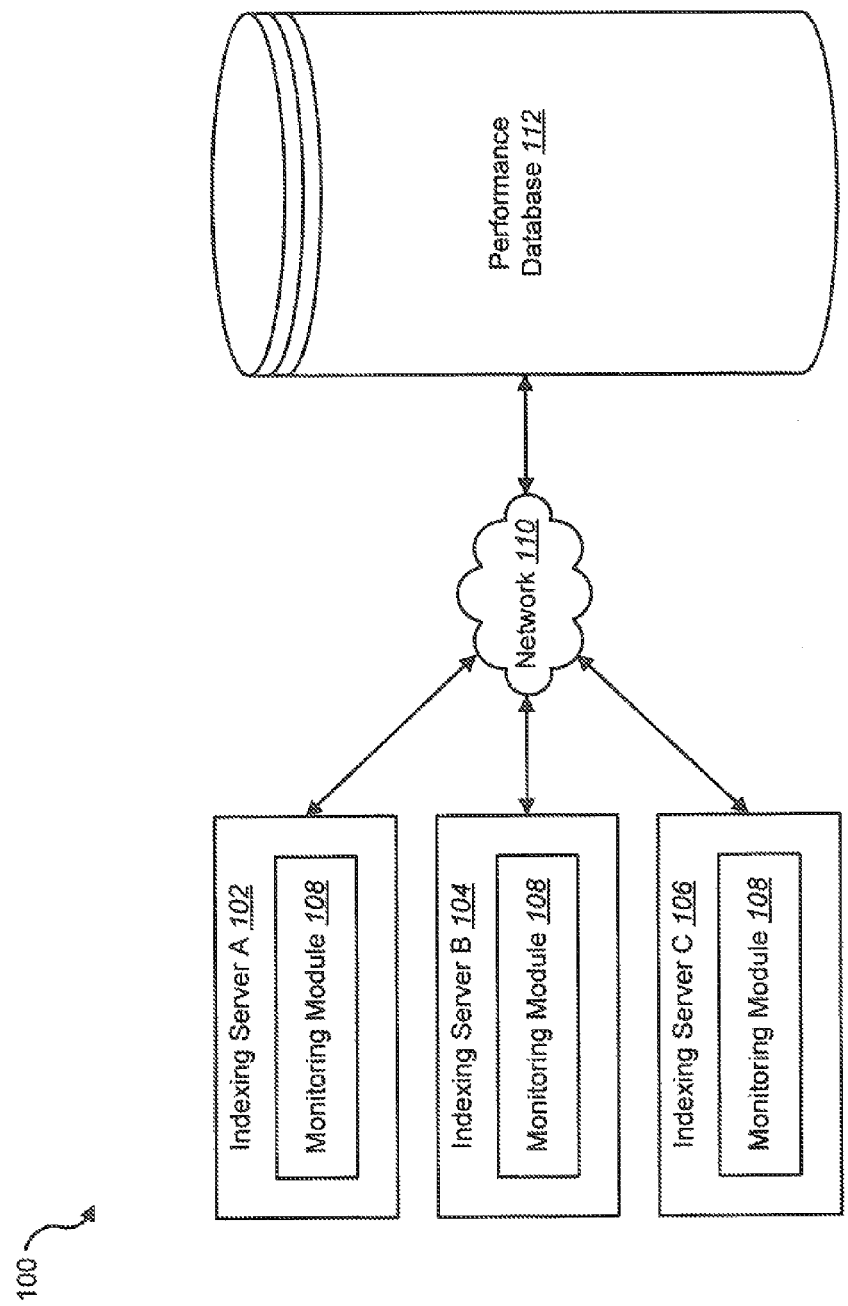
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Data relating to a computing device may be organized and stored for later retrieval. The data may be stored within a location on a computing device. Organizing and storing data may be referred to as indexing computer data. When data are indexed, a logical location to index the data on a computing device may be selected. The task of selecting a logical location for a new index of data is currently done on a random basis, based on the availability of existing open locations on a computing device. The random selection is used to provide some sort of load-balancing across all available locations within a computing device, as well as load-balancing across multiple computing device. The current process to select a logical location, however, does not apply any previous knowledge of a device's overall performance. The random selection process also does not apply previous knowledge related to the disk performance of a particular computing device. Further, the type of index (e.g., size, query frequency, etc.) is also not considered in the current process to select a logical location for a new index of data.

In one example, data may be indexed on various types of computing devices. For example, data may be indexed on a sever, such as, an indexing server. As previously explained, the current random selection of a location for a new index does not consider the past and current performance of an indexing server and the past and current performance of a particular location within an indexing server when determining where to store a new index of data.

The present systems and methods may utilize past performance information of an indexing server and past performance information of a physical location on a disk within an indexing server when selecting a logical location for an index. The present systems and methods may also use prior indexing and query performance statistics in order to select the most appropriate, logical index location for new indices. In one embodiment, the present systems and methods may alleviate the disadvantages associated with the current process of index location selection where specific indexing servers and physical disk locations are overloaded with very large and very heavily searched indexes, while other indexing servers and physical locations with the servers contain very small or not often search indexes. The present systems and methods may improve indexing and search performance for a wide variety of applications. For example, the present systems and methods may improve indexing and search performance for e-discovery applications. As will be described below, the present systems and methods may use a dynamic and intelligent logical location selection process in order to apply acquired knowledge at the time of selecting an index location. Further, the present systems and methods may enable an existing overloaded server with multiple index volumes to redistribute some (or all) of the index volumes across other available indexing servers.

FIG. 1 is a block diagram illustrating one embodiment of an environment 100 in which the present systems and methods may be implemented. In one configuration, one or more indexing servers 102, 104, 106 may communicate with a performance database 112. The indexing servers 102, 104, 106 may index one or more volumes of data. In one example, a monitoring module 108 may be installed on each of the indexing servers 102, 104, 106. While only three indexing servers are illustrated in the environment 100, it is to be understood that more or less than three indexing servers may be present in the environment 100.

In one configuration, the monitoring module 108 may collect information about the servers 102, 104, 106 and upload the collected information to the performance database 112. The servers 102, 104, 106 may communicate with the performance database 112 across a network connection 110. In another embodiment, the servers 102, 104, 106 may be directly connected to the performance database 112. The monitoring module 108 may also query the performance database 112 for information relating to the servers 102, 104, 106. Details regarding the monitoring module 108 and the performance database 112 will be described below.

Figure 2:
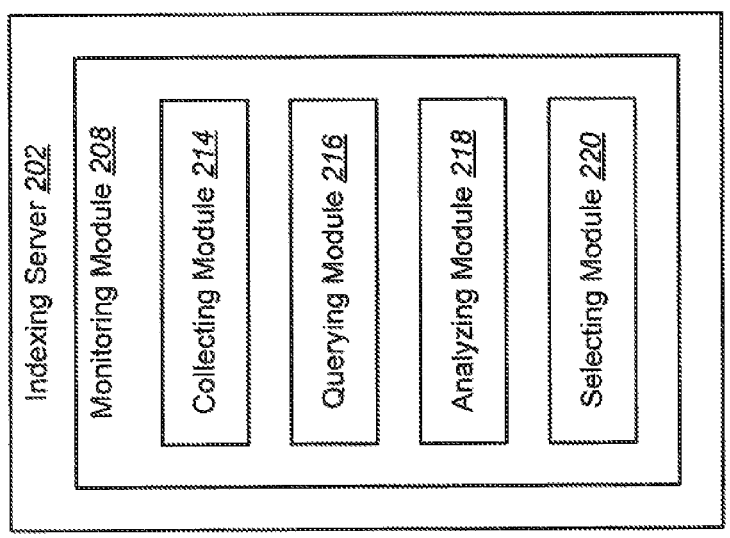
FIG. 2 is one embodiment of an indexing server that has been installed with a monitoring module.

FIG. 2 is one embodiment of an indexing server 202 that has been installed with a monitoring module 208. In one configuration, the monitoring module 208 may include a collecting module 214, a querying module 216, an analyzing module 218, and a selecting module 220.

In one embodiment, the collection module 214 may collect information regarding the indexing server 202. In one embodiment, the collecting module 214 may collect information relating to the performance of the indexing server 202. For example, the collecting module 214 may collect information indicating a processing speed of the server 202 during a certain time period, a response time to a request during a certain time period, and the like. The collecting module 214 may also collect information relating to the performance and utilization of various physical locations on the indexing server 202. For example, the collecting module 214 may collect performance information relating to a particular disk within the server 202. In addition, the collecting module 214 may collect information relating to the utilization of a particular section of memory within the server 202.

In one configuration, the collecting module 214 may upload the collected information to the performance database 112. In one example, the collecting module 214 may upload the information during a predetermined interval of time. For example, the collecting module 214 may collect and upload information relating to the performance of the indexing server 202, as well as the utilization of various physical locations on the indexing server 202, once every hour. As a result, the performance database 112 may store past performance information for one or more indexing servers and utilization information for one or more physical locations in the one or more indexing servers.

In one embodiment, the querying module 216 may query the performance database 112 for performance information relating to each indexing server that has previously uploaded the information to the database 112. The querying module 216 may also query the performance database 112 for utilization information relating to the utilization of various physical locations for each of the indexing servers that have previously uploaded the information to the database 112.

In one example, the analyzing module 218 may analyze the information received from the performance database 112 after the querying module 216 has queried the database 112. A selecting module 220 may select a particular indexing server and a physical location on the indexing server in which a new index of data may be stored. The selecting module 220 may select the particular indexing server and location on the indexing server 202 based on the analysis of data received from the performance database 112 performed by the analyzing module 218.

Figure 3:
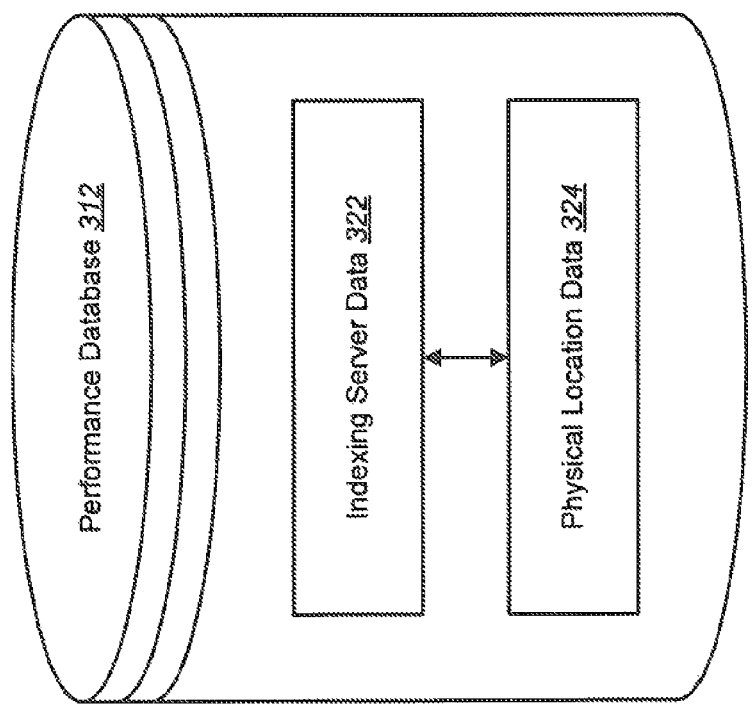
FIG. 3 is a block diagram illustrating one embodiment of a performance database.

FIG. 3 is a block diagram illustrating one embodiment of a performance database 312. The performance database 312 may store various types of data. For example, the performance database 312 may store indexing server data 322 and physical location data 324. In one configuration, the indexing server data 322 may be data relating to the performance and other characteristics of one or more indexing servers. For example, the indexing server data 322 may include data relating to the past performance of indexing server A 102, indexing server B 104, and indexing server C 106. The monitoring module 108 installed on each indexing server 102, 104, 106 may collect and upload performance data for each server to the performance database 312. The database 312 may store this performance data as the indexing server data 322.

In one embodiment, the physical location data 324 may relate to the utilization of various physical locations of various indexing servers. For example, the physical location data 324 may include information relating to the performance and utilization of a particular central processing unit (CPU) on indexing server A 102. As another example, the physical location data 324 may include information relating to the performance and utilization of a particular memory location in server B 104.

Figure 4:
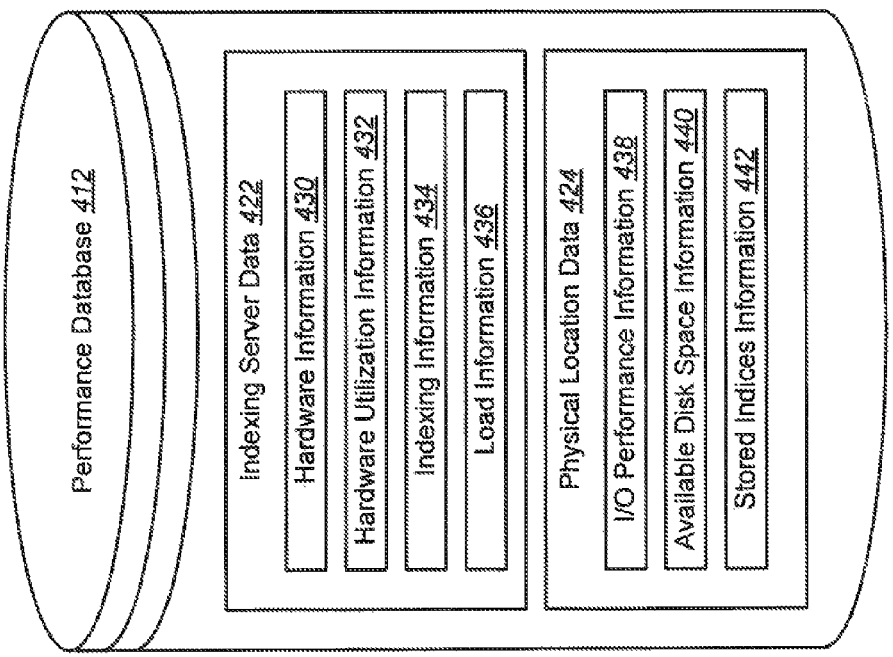
FIG. 4 is a block diagram illustrating a further embodiment of a performance database.

FIG. 4 is a block diagram illustrating a further embodiment of a performance database 412. As previously explained, the performance database 412 may store indexing server data 422 and physical location data 424.

In one embodiment, the indexing server data 422 may include one or more parameters of information. In one example, the indexing server data 422 may include hardware information 430 for one or more indexing servers. Examples of hardware information 430 may include, but are not limited to, the number of CPUs within a indexing server, available memory locations on one or more indexing servers, and the like. The indexing server data 422 may also include hardware utilization information 432. The utilization information 432 may be information relating to the performance and utilization of various hardware components that are identified in the hardware information 430. For example, the hardware utilization information 432 may include information relating to the average CPU and memory utilization for one or more indexing servers.

The indexing server data 422 may further include indexing information 434. Examples of indexing information 434 may include, but are not limited to, the number of physical indices hosted by an indexing server, the average number of in-memory indices per hour, the average size of a physical index on an indexing server, and the like. Load information 436 may also be included as part of the indexing server data 422. The load information 436 may include information relating to an indexing load (the average number of documents indexed per hour) for an indexing server. The load information 436 may also include information relating to a query load for an indexing server. An example of a query load may be, but is not limited to, the number of queries received for a particular index. Information relating to a query load may also indicate the number of search results from the query that are generated per hour.

The performance database 412 may also include physical location data 424. An example of physical location data 424 may include input and output performance information 438. For example, the input and output performance information 438 may indicate the performance of read and write operations directed to a particular physical location on an indexing server. The physical location data 424 may also include available disk space information 440. The available disk space information 440 may indicate the disk space on a particular indexing server that may be available to store a new index of data. Further, the physical location data 424 may include stored indices information 442. The stored indices information 442 may indicate the number of indices stored at a particular physical location of a certain indexing server.

In one embodiment, the analyzing module 218 may analyze one or more parameters associated with the indexing server data 422 and the physical location data 424 in order to select a logical location (i.e., a particular indexing server and a physical location within that indexing server) for a new index of data. The description below provides one example of an algorithm that may be used by the analyzing module 218 to generate a score for the index server data 422 and the physical location data 424 for one or more indexing servers. The logical location for the new index may be selected based on the generated scores for the one or more indexing servers. Other algorithms, in addition to the algorithm described below, may be used with the present systems and methods in order to select a logical location for a new index of data. In addition, the algorithm described below may be used to select a logical location to relocate an index of data currently stored on an indexing server that may be overloaded.

The parameters described above relating to the indexing server data 422 may be normalized (e.g., using min-max or sigmoid logistic functions) before they are entered into a weighted equation. In one embodiment, certain parameters may be a "positive factor" and other parameters may be a "negative factor" in the weighted equation. Each "factor" may be represented as "w". In one embodiment, a first parameter may be associated with a "factor" of "w1", a second parameter may be associated with a "factor" of "w2", and the like. The output of the weighted equation may be a "indexing server performance score" (IQSPS) for a particular indexing server. The IQSPS for each indexing server may be normalized to a percentage scale that may be used to select the indexing server with the optimal performance in relation to the other indexing servers.

In one embodiment, in order to determine an IQSPS, each piece of information that is part of the indexing server data 422 may be normalized to a percentage scale. In one embodiment, each parameter of the indexing server data 422 may be defined across intervals that provide an optimal approximate percentage equivalent.

In one example, a min-max normalization may be used for CPU and read-access-memory (RAM) based on CPU measured in number of cores and RAM in gigabytes (GB). In one embodiment, the combined value (using the parameters described above as an example) may be ServerSpec (number of CPUs and available memory)=Cores*RAM-GB. In one example, the min-max working interval may be set as [1 Core and 4 GB] and [8 Cores and 32 GB]. As a result, the possible value min-max range may be [4, 256]. In one configuration, values below the minimum may not be recommended and may be marked as zero "0" and values above 256 may be over assigned a percentage over 100%.

The following description provides numerous examples of different CPU and memory measurements and the normalized value (with associated percentage) that results from each example. In a first example, CPU=4 cores and RAM=8 GB. As a result, ServerSpec=32. The normalized value may thus be (32−4)/(252)=11.11%. In a second example, CPU=4 cores and RAM=16 GB. As a result, ServerSpec=64. The normalized value may be (64−4)/(252)=23.8%. In a third example, CPU=8 cores and RAM=16 GB. ServerSpec=128 and the normalized value may be (128−4)/(252)=49.2%. In a fourth example, CPU=8 cores and RAM=32 GB. ServerSpec=256. The normalized value may be (256−4)/(252)=100%. In a fifth example, CPU=16 cores and RAM=64 GB. ServerSpec=1024. The normalized value may be (1024−4)/(252)=404%.

In one embodiment, an algebraic representation using normalized values of the various parameters of the indexing server data 422 described above may be: IQSPS=w1*ServerSpec−(w2*NCPUMemUtilization+ w3*NHostedIndices+w4*NAvgInMemoryIndices+ w5*NAvgIndexSize+w6*NIndexLoad+w7*NQueryLoad). In another embodiment, the algebra representation may be: IQSPS=w1*ServerSpec/Ln(w2*NCPUMemUtilization+ w3*NHostedIndices+w4*NAvgInMemoryIndices+ w5*NAvgIndexSize+w6*NIndexLoad+w7*NQueryLoad). In yet another embodiment, the representation may be: IQSPS=w1*ServerSpec−AVG (w2*NCPUMemUtilization+ w3*NHostedIndices+w4*NAvgInMemoryIndices+ w5*NAvgIndexSize+w6*NIndexLoad+w7*NQueryLoad).

In the case of the physical location data 424, the parameters of the I/O performance information 438 and the available disk space information 440 may be offset against the number of indices stored on the particular location. The result from this offset may be a "physical location performance score" (PLPS). In one embodiment, an algebra representation of the PLPS may be: PLPS=w8*NIOPerf+ w9*NAvailableDiskSpace−w10*NHostedIndices. In another embodiment, the representation of the PLPS may be PLPS=(w8*NIOPerf+w9*NAvailableDiskSpace)/Ln (w10*NHostedIndices).

In one configuration, w1 to w10 (in this example) may be defined as a value between 1 and 100, 0 to 1.0, and the like. The algorithm may reveal the optimal logical location to store a new index volume. In one embodiment, the optimal logical location may be selected from the highest server performance score (IQSPS) combined with the best location score (PLPS). The combined scores may then be normalized into a single final score. In the case where all the servers and physical locations score within approximately 5% of each other, the selection of the logical location may be done on a round-robin selection (i.e., choose the next server from a list).

As previously explained, the statistical and performance information referenced above may be collected at regular time intervals (e.g., every hour or another configurable interval) by the monitoring module 108 installed within each indexing server 102, 104, 106. The statistical information may be uploaded to the database 112 that stores the configuration settings for each indexing server. The collecting and uploading of the performance information during regular time intervals may provide a moving average or time series forecasting, as otherwise changes in performance metrics (e.g., memory or CPU utilization) over short periods may skew the algorithm. The algorithm may avoid overloading a single index location. As a result, the algorithm of the present systems and methods may include a safety mechanism in order to ensure that the load is distributed evenly across similarly performing locations (such as, but not limited to, performing locations with normalized scores within 5% or 10% of each other).

Figure 5:
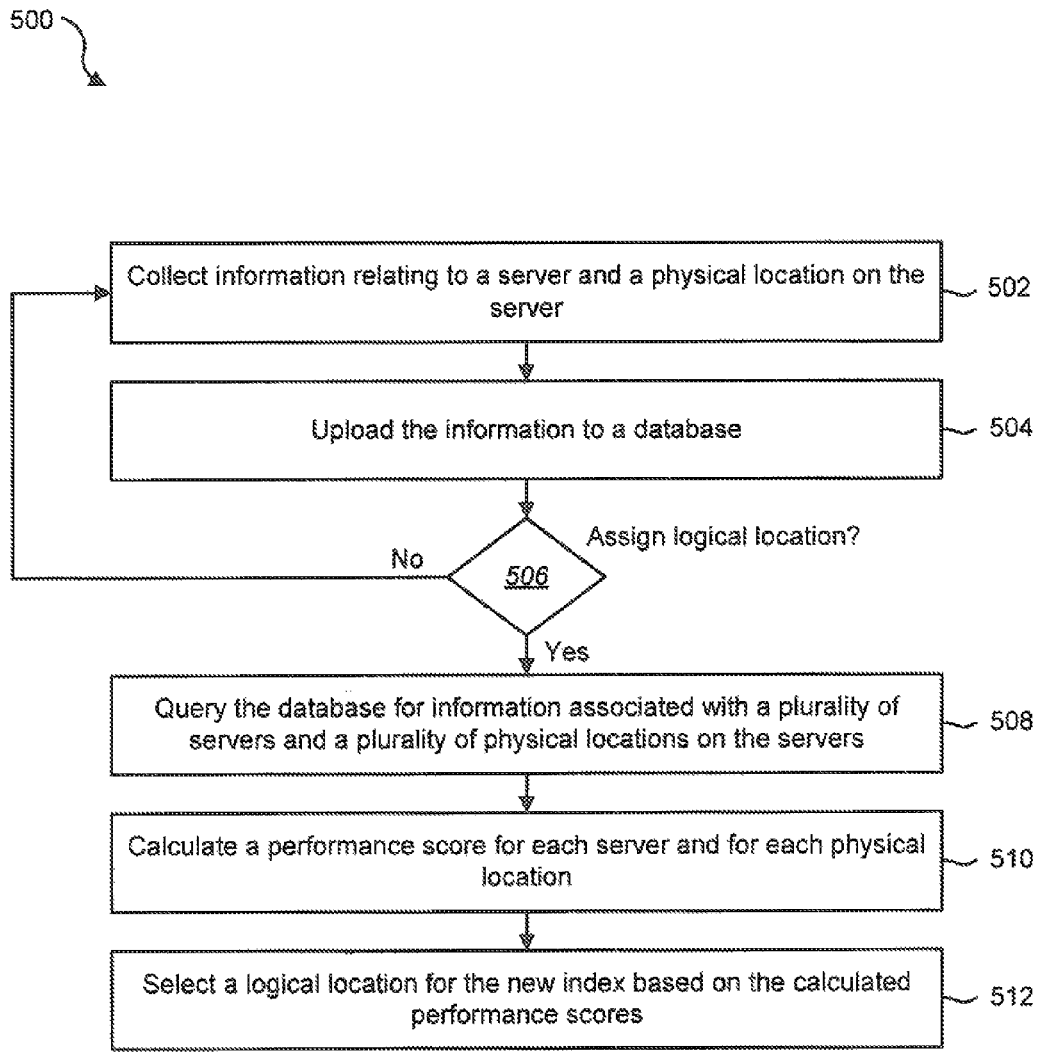
FIG. 5 is a flow diagram illustrating one embodiment of a method for dynamically selecting a logical index location.

FIG. 5 is a flow diagram illustrating one embodiment of a method 500 for dynamically selecting a logical index location. The method 500 may be implemented by the monitoring module 108.

In one embodiment, performance information relating to a server and utilization information relating to a physical location on the server may be collected 502. The collected information may be uploaded 504 to a database. A determination 506 may be made as to whether a logical location is needed for a data index volume. If it is determined 506 that there is no index that needs to be assigned a location, the method 500 may return to collect 502 performance information relating to the server and utilization information relating to a physical location on the server. If, however, it is determined 506 that a logical location is needed for an index, the database may be queried 508 for performance information associated with a plurality of servers and utilization information associated with a plurality of physical locations on the servers. A device score for each server and a location score for each physical location may be calculated 510. A logical location (i.e., a server and physical location on the server) for the new index may be selected 512 based on the calculated performance scores as described above.

Figure 6:
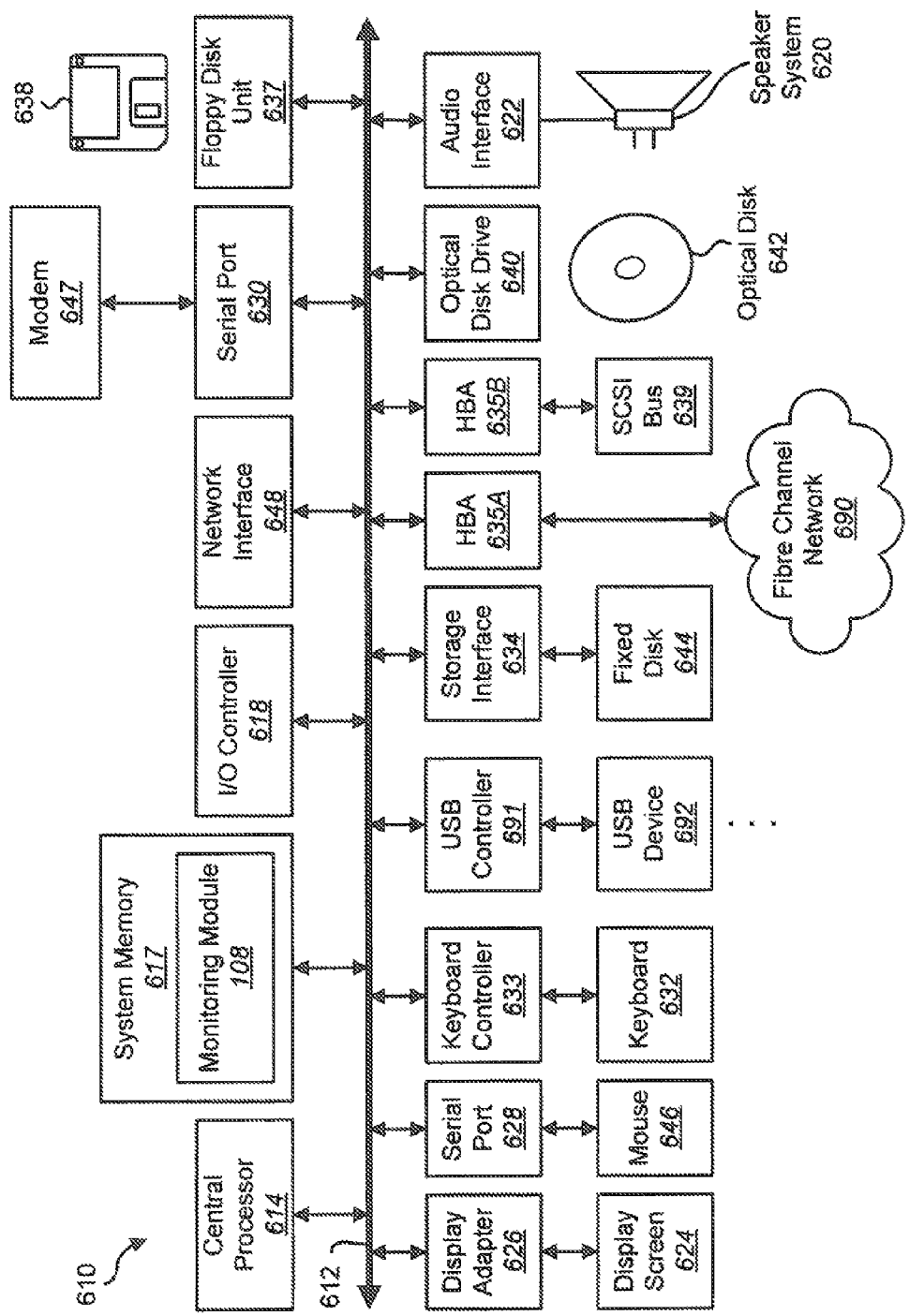
FIG. 6 depicts a block diagram of a computer system suitable for implementing the present systems and methods.

FIG. 6 depicts a block diagram of a computer system 610 suitable for implementing the present systems and methods. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), multiple USB devices 692 (interfaced with a USB controller 691), a storage interface 634, a floppy disk drive 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the monitoring module 108 to implement the present systems and methods may be stored within the system memory 617. Applications resident with computer system 610 are generally stored on and accessed via a computer readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 6 need not be present to practice the present systems and methods. The devices and subsystems can be interconnected in different ways from that shown in FIG. 6. The operation of a computer system such as that shown in FIG. 6 is readily known in the art and is not discussed in detail in this application. Code to implement the present disclosure can be stored in computer-readable medium such as one or more of system memory 617, fixed disk 644, optical disk 642, or floppy disk 638. The operating system provided on computer system 610 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
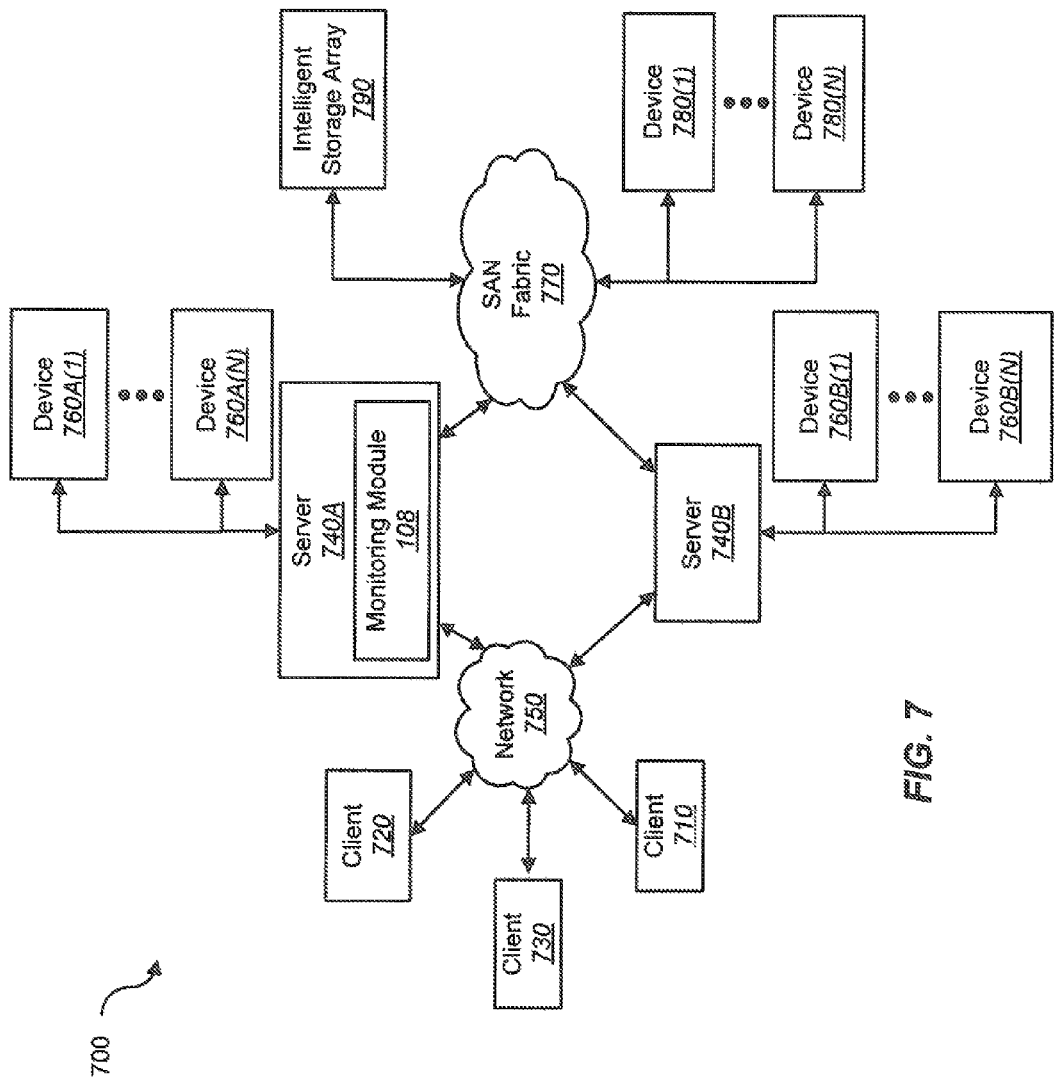
FIG. 7 is a block diagram depicting a network architecture in which client systems, as well as storage servers (any of which can be implemented using computer system), are coupled to a network.

FIG. 7 is a block diagram depicting a network architecture 700 in which client systems 710, 720 and 730, as well as storage servers 740A and 740B (any of which can be implemented using computer system 610), are coupled to a network 750. In one embodiment, the monitoring module 108 may be located within a server 740A, 740B to implement the present systems and methods. The storage server 740A is further depicted as having storage devices 760A(1)-(N) directly attached, and storage server 740B is depicted with storage devices 760B(1)-(N) directly attached. SAN fabric 770 supports access to storage devices 780(1)-(N) by storage servers 740A and 740B, and so by client systems 710, 720 and 730 via network 750. Intelligent storage array 790 is also shown as an example of a specific storage device accessible via SAN fabric 770.

With reference to computer system 610, modem 647, network interface 648 or some other method can be used to provide connectivity from each of client computer systems 710, 720, and 730 to network 750. Client systems 710, 720, and 730 are able to access information on storage server 740A or 740B using, for example, a web browser or other client software (not shown). Such a client allows client systems 710, 720, and 730 to access data hosted by storage server 740A or 740B or one of storage devices 760A(1)-(N), 760B(1)-(N), 780(1)-(N) or intelligent storage array 790. FIG. 7 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for dynamically selecting a logical location for an index, comprising:
    collecting information relating to a computing device and a location within the computing device;
    uploading the information to a database;
    querying the database for stored information relating to a plurality of computing devices and at least one storage location within each of the plurality of computing devices;
    determining a maximum and minimum performance interval based on the stored information relating to the plurality of computing devices;
    calculating a device score from the stored information for each of the plurality of computing devices, wherein the device score is based on a product of a number of processor cores and an amount of available read-access memory (RAM) in each of the plurality of computing devices;

normalizing the device score for each of the plurality of computing devices in relation to the maximum and minimum performance interval;

calculating a location score from the stored information for the at least one storage location within each of the plurality of computing devices, the location score being calculated at least in part on past performance information of the storage location during a period of time;

combining the normalized device score and the location score related to each computing device to obtain a final score for each of the plurality of computing devices; and selecting a logical location for the index based on the final score of one of the plurality of computing devices.

2. The method of claim 1, wherein selecting a logical location comprises selecting a computing device and a location within the selected computing device to store the index.

3. The method of claim 1, wherein the information relating to the computing device comprises information relating to the performance of the computing device.

4. The method of claim 1, wherein the information relating to the location within the computing device comprises information relating to the utilization of the location.

5. The method of claim 1, wherein calculating a performance score comprises assigning a weight factor to at least one parameter of the stored information relating to each of the plurality of computing devices and the at least one location within each of the plurality of computing devices.

6. The method of claim 1, further comprising relocating an existing index from an overloaded computing device to at least one additional computing device.

7. The method of claim 1, further comprising uploading the information to the database during a predetermined interval of time.

8. A computer system configured to dynamically select a logical location for an index, comprising:

a processor;

memory in electronic communication with the processor, instructions stored in the memory, the instructions being executable by the processor to:

collect information relating to the computer system and a logical location within the computer system;

upload the information to a database;

query the database for stored information relating to a plurality of computing devices and at least one storage location within each of the plurality of computing devices;

determine a maximum and minimum performance interval based on the stored information relating to the plurality of computing devices;

calculate a device score from the stored information for each of the plurality of computing devices, wherein the device score is based on a product of a number of processor cores and an amount of available read-access memory (RAM) in each of the plurality of computing devices;

normalize the device score for each of the plurality of computing devices in relation to the maximum and minimum performance interval;

calculate a location score from the stored information for the at least one storage location within each of the plurality of computing devices, the location score being calculated at least in part on past performance information of the storage location during a period of time;

combine the normalized device score and the location score related to each computing device to obtain a final score for each of the plurality of computing devices; and select a logical location for the index based on the final score of one of the plurality of computing devices.

9. The computer system of claim 8, wherein the processor is further configured to select at least one computer system and at least one logical location within the selected computer system to store the index.

10. The computer system of claim 8, wherein the information relating to the computer system comprises information relating to the performance of the computer system.

11. The computer system of claim 8, wherein the information relating to the logical location within the computer system comprises information relating to the utilization of the logical location.

12. The computer system of claim 8, wherein the processor is further configured to assign a weight factor to at least one parameter of the stored information relating to each of the plurality of computing devices and the at least one location within each of the plurality of computing devices.

13. The computer system of claim 8, wherein the processor is further configured to relocate an existing index from an overloaded computer system to one or more additional computer systems.

14. The computer system of claim 8, wherein the monitoring module is further configured to upload the information to the database during a predetermined interval of time.

15. A computer-program product for dynamically selecting a logical location for an index, the computer-program product comprising a non-transitory computer-readable medium storing instructions thereon, the instructions being executable by a processor to:

collect information relating to a computing device and a logical location within the computing device at a predetermined interval of time;

upload the information to a database at the predetermined interval of time;

query the database for stored information relating to a plurality of computing devices and at least one storage location within each of the plurality of computing devices;

determine a maximum and minimum performance interval based on the stored information relating to the plurality of computing devices;

calculate a device score from the stored information for each of the plurality of computing devices, wherein the device score is based on a product of a number of processor cores and an amount of available read-access memory (RAM) in each of the plurality of computing devices;

normalize the device score for each of the plurality of computing devices in relation to the maximum and minimum performance interval;

calculate a location score from the stored information for the at least one storage location within each of the plurality of computing devices, the location score being calculated at least in part on past performance information of the storage location during a period of time;

combine the normalized device score and the location score related to each computing device to obtain a final score for each of the plurality of computing devices; and select a logical location for the index based on the final score of one of the plurality of computing devices.

16. The computer-program of claim 15, wherein the instructions are further executable by the processor to select at least one computing device and at least one logical location within the selected computing device to store the index.

* * * * *